United States Patent Office.

ERNEST SOLVAY, OF BRUSSELS, BELGIUM.

MANUFACTURE OF BLEACHING-POWDER.

SPECIFICATION forming part of Letters Patent No. 339,493, dated April 6, 1886.

Application filed May 20, 1884. Serial No. 132,186. (No specimens.) Patented in Belgium May 6, 1884, No. 65,070; in England May 6, 1884, No. 7,259; in France May 6, 1884, No. 161,938; in Austria-Hungary May 6, 1884, No. 23,725 and No. 2,210, and in Germany May 7, 1884, No. 31,219.

*To all whom it may concern:*

Be it known that I, ERNEST SOLVAY, a Belgian subject, residing at Brussels, in the Kingdom of Belgium, have invented certain new and useful Improvements in the Manufacture of Chloride of Lime; and I do hereby declare that the following is a full, clear, and exact description of the invention, which will enable others skilled in the art to which it appertains to make and use the same.

In the specifications of Letters Patent granted to me in the United States, dated the 31st of August, 1880, No. 231,860, for improvements in the manufacture of chloride of lime, and the 21st of December, 1880, No. 235,820, for apparatus for the decomposition of chloride of calcium, I described the process and apparatus employed by me in the manufacture of chlorine by means of chloride of calcium. Since that time I have continued my researches, and have invented the improvements hereinafter described relating to the absorption of the chlorine by lime. The chlorine which I obtain by those processes is highly diluted with air and nitrogen, and it is a difficult matter to cause the lime to absorb the chlorine, it being remembered that chloride of lime is generally desired for commercial and economic uses in a powdered condition. If the powdered lime be placed in a receptacle and the diluted gas be forced upward through it, channels or canals are formed in the mass, permitting the escape of the gas therethrough. The lime in the vicinity of such channels or canals alone is thoroughly chloridized, while the remainder is imperfectly, if at all, chloridized. This effect is due to the fact that as the pulverized lime is without support against the upward force of the compressed gas it is disrupted, lifted, and broken up in isolated spots, thereby permitting the escape of the gas through such openings. I have found, however, that if the lime be placed in porous receptacles or in porous beds, which are then superimposed one upon the other, forming a stack, and the dilute gas be drawn or forced through the mass downwardly, such channels are not formed, but the gas passes through the lime equally, chloridizing the entire mass and avoiding waste of the chlorine. This is due to the fact that as the lime rests upon a porous or pervious support the gas driven down thereupon, instead of lifting and breaking up the pulverulent mass, only tends to pack it more closely down upon its bed, thereby insuring a passage of the gas through all parts of the bed equally, or substantially so, the porous or pulverulent bed providing a sufficient passage for the gas and preventing the lime from choking the pervious shelf or floor on which it lies. These porous receptacles may be formed of any material not affected by the chlorine or the lime.

I have found a fabric made of asbestus cloth very useful and efficient for this purpose, it being used to form the bottoms of trays or beds on which the pulverulent lime is spread to a sufficient or desirable depth. These trays or beds, being then imposed one on another, form a stack, which may be connected at the top to any suitable source of chlorine or to a chlorine-generator, the chlorine then passing downwardly through the various beds or trays and the lime spread thereon. If desired, the passage of the chlorine therethrough may be aided by any of the well-known forms of force or of exhaust pumps.

Heretofore lime has been chloridized by placing it upon gratings or perforated shelves and passing the gases through the layers; but such is not broadly claimed by me.

Having thus described my invention, what I claim is—

1. The process herein described of chloridizing lime, said process consisting in placing the lime upon porous or pulverulent beds arranged one above another in a closed receptacle, and then drawing or forcing chlorine gas in a downward direction through the lime, substantially as described.

2. The process hereinbefore described of chloridizing lime, said process consisting in placing the lime in a pulverized condition upon one or more porous beds in a closed chamber, and then drawing or forcing the chlorine gas in a downward direction through the lime and the porous or pulverulent beds, substantially as described.

ERNEST SOLVAY.

Witnesses:
R. S. KIRKPATRICK,
H. T. E. KIRKPATRICK.